April 22, 1941.  W. W. BOES  2,239,188
FILM CARTRIDGE LOADER
Filed Feb. 9, 1939  2 Sheets-Sheet 1
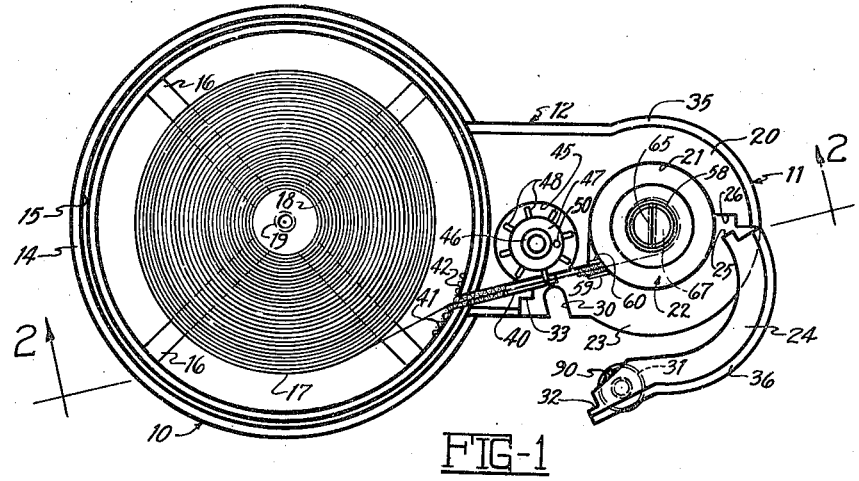
INVENTOR
WALTER W. BOES
BY Orme E. Cheatham
ATTORNEY April 22, 1941.  W. W. BOES  2,239,188
FILM CARTRIDGE LOADER
Filed Feb. 9, 1939  2 Sheets-Sheet 2
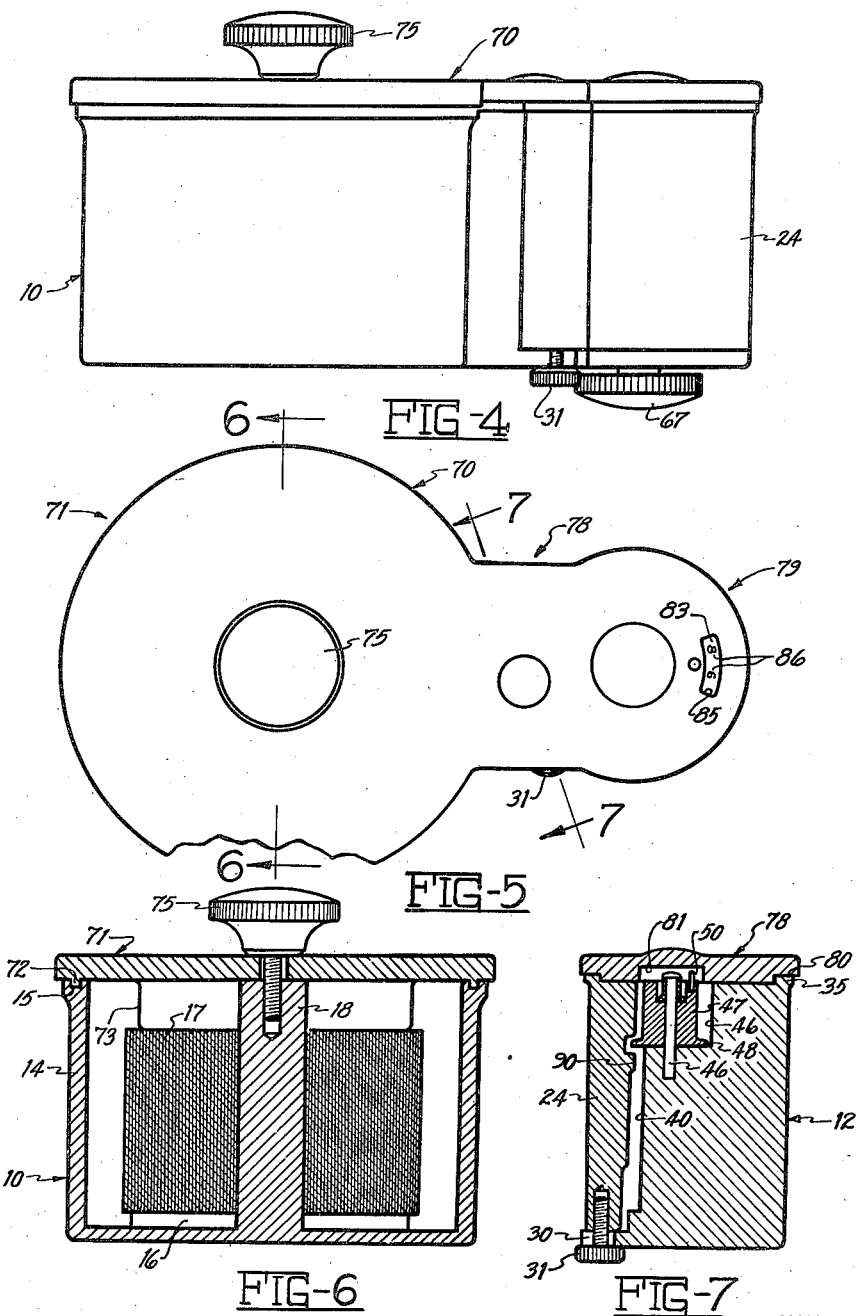
INVENTOR
WALTER W. BOES
BY Orme E. Cheatham
ATTORNEY Patented Apr. 22, 1941

2,239,188

UNITED STATES PATENT OFFICE 2,239,188

FILM CARTRIDGE LOADER

Walter W. Boes, Dayton, Ohio

Application February 9, 1939, Serial No. 255,434

6 Claims. (Cl. 242—55)

This invention has to do with the art of photography and in particular comprises means whereby photographers may load film cartridges from a roll of bulk film. My invention fills a need in the business and hobby of taking pictures which has developed with the increasing use of eight, sixteen and thirty-five millimeter cameras which use a continuous length of perforated film. Cameras of the thirty-five millimeter type use a film, usually thirty-six frames in length, contained in a film cartridge which consists of a cylindrical shell having a central core provided with stem engaging means and which is provided with a light-trapped opening from which the film may be pulled by the feeding mechanism of the camera. The film may be purchased in bulk rolls of twenty-five, fifty, one hundred, or more feet at a very substantial savings over the cost of the same number of feet of film rolled into cartridges each holding several feet or sufficient to take eighteen or thirty-six exposures, since the cost of the cartridges and the labor expense involved in winding film into the cartridges is considerable. Accordingly, it has been found advisable by most photographers to buy bulk film and several empty cartridges, and to load the cartridges in their own dark rooms. Since the advent of modern films, it has become more and more difficult for the average amateur photographer to effect the above described savings since modern films are sensitive to all light waves, whereas older types of film were insensitive to red or some other particular light and the amateur could load cartridges in a dark room having a source of red or other suitable light. This is impossible with the modern films with the result that the photographer is obliged to work in absolutely total darkness. For this purpose most films are provided with edge notches, spaced the length of eight or more frames, so that the photographer may load a cartridge until his finger contacts a notch or number of notches, cut the loaded cartridge from the bulk roll at a notch, and replace the bulk roll in its container before turning on the lights. When working in absolute darkness it often happens that a part of the cartridge is dropped and lost with the result that a length of film is wasted. In any event it is practically impossible to keep from placing finger prints on the film, and in many cases some faint source of light will cause the film to become fogged. My invention overcomes all of the above objections to the purchase of bulk film.

Another object of my invention is to make possible the loading of a cartridge with sufficient frames to take a desired number of exposures, such as four, ten or fifteen, without wasting any portion of the film except the leading and trailing pieces generally lost. In dark room loading the photographer was practically forced to load a cartridge with thirty-six frames since he had no means of determining the amount of film loaded into the cartridge other than by means of the edge notches spaced at eight or more frames and, accordingly, it was necessary to take from eight to thirty-six exposures and develop the film at once even though the photographer desired to take only a few pictures, or wait until other subjects were photographed and the entire film exposed. My invention makes possible the exposure of as many pictures as desired without substantial film wastage, since a feature of my invention is that the loading of any number of frames may be accomplished without the use of a dark room.

Having described the principal objects and advantages of the present invention, the same should be more perfectly understood by reference to the accompanying description and drawings of a preferred form of the invention, wherein like numerals refer to like parts throughout.

In the drawings Fig. 1 is a plan view of the body of my invention showing a short roll of bulk film in position in the loader, with its end being wound into a film cartridge positioned within the loader; Fig. 2 is a vertical cross section taken substantially along line 2—2 of Fig. 1; Fig. 3 is a bottom view of the cover of the loading device; Fig. 4 is an outside front elevation of the loader in assembled condition; Fig. 5 is a plan view of the loader in assembled condition; Fig. 6 is a vertical section taken substantially along line 6—6 of Fig. 5; and Fig. 7 is a vertical section taken substantially along line 7—7 of Fig. 5.

My invention comprises a moulded body consisting of a bulk film container 10 and a cartridge container 11 joined by a connecting portion 12. The bulk film container 10 comprises a cylindrical wall 14, the top of which terminates in a fairly broad edge having a central groove 15. The bottom of the container is preferably provided with a plurality of spacing ribs 16 by means of which the roll of film 17 may be spaced from the lower surface in order to reduce friction in unwinding. A central core 18 rises from the bottom preferably to the height of the side wall 14 and is provided with a central threaded, longitudinal opening 19.

The cartridge container 11 comprises a partial wall 20 integrally moulded with the connecting portion 12 so as to provide the major portion of the wall of a space 21 of substantially cylindrical form and of sufficient diameter to receive the ordinary film loading cartridge 22. The bottom wall 23 of the cartridge container is also moulded with the connecting portion 12, but the remainder of the wall of the cartridge receiving space is provided by a laterally-removable, side-wall-forming door 24. The door 24 and the wall 20 are provided with complementary light-trapping edges at 25 and 26, respectively, which interlock so that when the removable door 24 is positioned as shown in Fig. 1, then pivoted inwardly to assume the position shown in Figs. 4, 5 and 7, the complementary portions hold the door in place. It is to be appreciated that a permanently attached hinged portion could be used if desired. The bottom 23 is provided with a notch 30 and the door 24 is provided with a locking screw 31, the stem of which engages in the notch 30 to lock the door in position when screwed tight. The end of the door adjacent the screw 31 and the connecting portion 12 are provided with light-trapping edges at 32 and 33, respectively, so that when the door is in place light may not enter the cartridge receiving opening 21 laterally through the door. The connecting portion 12 and the partial wall 20 are provided with a marginal, light-trapping, projecting bead 35 and the door 24 is provided with a similar bead 36.

The connecting portion 12 is provided with a slot or passageway 40 through which an end of the film 17 may be drawn from the bulk film container into the space 21. The passageway 40 is preferably several times the thickness of a film, but is preferably so narrow that two pieces 41 and 42 of flexible material, such as black velvet, may be fastened to the inner surface of wall 14 and to the inner surfaces of passageway 40 so as to form a complete light trap for the interior of the bulk film container 10. The nap of the velvet will bend to permit the passage of the film 17 without scratching or marring the surface thereof. Adjacent the notch 30 there is provided a sprocket receiving socket 45 in which is mounted a pivot 46 carrying a sprocket 47 provided with lugs 48 spaced sufficiently to engage each successive feed hole 49 of the film 17 as it is drawn through the passageway 40. The upper end of the sprocket 47 is provided with a vertical pin 50 which makes one complete revolution for each frame of film, or if desired, may make one complete revolution for each half frame or for every two frames. In order to keep the lugs from jumping out of the holes the door 24 is preferably provided with a rounded film engaging ridge 90 immediately adjacent the point of engagement of the lugs 48 with the film.

A usual type of film cartridge is illustrated in Figs. 1 and 2, the same comprising a cylindrical shell 55, removable end caps 56 and 57, and a central core 58. The cylindrical portion 55 is provided by bending a flat sheet into substantially cylindrical shape, but instead of connecting the ends of the sheet they are permitted to project at 59 and 60 in a substantially tangential direction so as to provide a film passageway through which the film may be wound upon the core 58 or removed from the cartridge. Pieces of black velvet or similar material are adhered to the opposed surfaces of the ends 59 and 60 so as to form a light trap for the film in the cartridge. It is to be noted that the cartridge-receiving space 21 is so shaped as to leave a free space for the projecting edges 59 and 60 of the shell 55, but that the projecting edges of the velvet adhered thereto will extend between the adjacent surfaces of the connecting portion 12 and the door 24 so that but a short portion of film will be exposed when the door 24 is removed.

The usual film cartridge is provided with a crossbar 65 inside of the core 58 and I provide an opening 66 in the bottom 23 through which the bifurcated stem of a winding key 67 may be inserted to engage the crossbar 65 in order that the core 58 may be rotated in order to wind film thereon within the cartridge 22.

Completely light-proof bulk film and cartridge spaces are provided by the top cover 70 which has an outline substantially identical to the outline of the body portion. The main part 71 provides a cover for the bulk film container 10 and is provided with a circumferential ridge 72 which fits into the groove 15 so as to prevent light from leaking between the top of wall 14 and the lower surface of the cover. The cover is provided with spaced ridges 73 which extend within the container 10 and substantially engage the upper edge of the film 17 in order to prevent it from moving vertically within the container. A central opening 74 is provided through which a cap screw 75 may be inserted to engage in the threaded opening 19 to lock the cover member in position. The connecting portion 78 and the cartridge container closing portion 79 are provided with a continuous edge recess 80 within which fits the beads 35 and 36 of the body portion and the door 24 so as to light-trap the adjacent surfaces. The connecting portion 78 is provided with a recess 81 within which the pin 50 extends in order that the same may engage the teeth 82 of an indicating member 83 which is mounted upon a pivot 84 fastened in the cover. An opening 85 is provided in the cover through which a peripheral section of the indicating member 83 may be inspected, and the surface of the member 83 which is visible through the opening 85 is provided with indicia 86 which indicate the number of frames wound upon the cartridge.

In using my invention a roll of bulk film is purchased and, before removing the film from its light-proof container, the loading device and the film are taken to any available dark room. The film is placed in the bulk film container 10 and its end is drawn through the passageway 40 for a sufficient length so that it may be grasped when the cover 70 is in place. The cover 70 is then positioned on the main body portion and the cap screw 75 is inserted to lock the two together.

The device may now be removed from the dark room and may be carried wherever desired, since cartridges may be loaded in daylight or any lighted room. This is accomplished by fastening the exposed end of the film 17 to the central core 58 of an empty cartridge by suitable means such as a piece of tape. One or two frames extending beyond the edges of the velvet strips 41 and 42 will be exposed, but this much wastage is necessary regardless of how the cartridge is loaded since one or two frames of film cannot be removed from the cartridge in any camera. The end caps 56 and 57 are now positioned to complete the cartridge 22 which is laterally swung into the space 21, and the interlocking faces 25 and 26 of the removable door and the side wall are now engaged and the door is pivoted into place and locked there by means of the locking screw 31. Care must be exercised to see that the lugs 48 of sprocket 47 are engaged in the holes 49 of the film while the door is being positioned, and preferably that the indicating member is set at a starting position which is such as to cause the exposed portion of the film to be wound into the cartridge before the indicia start to pass the midpoint of the window or opening 85. The winding key 67 may now be inserted and the cartridge rotated a slight amount in order to draw the exposed portion adjacent the sprocket into the cartridge. As the key is rotated it will draw the film from the bulk roll and the holes in the film will engage the lugs 48 and rotate the pin 50 to engage the teeth 82 of the indicating member 83. The indicia 86 can now be observed and the key rotated until the desired number of frames as indicated by the indicia is in the cartridge. When the desired number of frames have been wound upon the core 58 an extra frame or two may be added in order to be assured of a sufficient length of film, and then the door 24 may be removed laterally so as to expose a short length of film adjacent the sprocket 47. A sharp knife may now be drawn across the film at the exposed portion so as to detach the loaded cartridge, leaving a short length of film which may be grasped for the next loading operation. The loaded cartridge can then be placed in a camera, the door 24 replaced in order to keep the device in assembled relation and the device stored in the type of enclosure recommended by the film manufacturer until the next cartridge loading operation.

Having described and illustrated a preferred embodiment of my invention it is to be appreciated that I am not limited to the exact form set forth since many modifications and alterations in detail and arrangement should be obvious to those skilled in the art.

I claim:

1. A film cartridge loader comprising a bulk film roll container having an integral extension thereon forming part of a cartridge container, a movable section forming the remainder of the cartridge container when in position and providing a lateral opening through which a cartridge may be inserted or removed, a constantly light-trapped passageway comprising a slot formed in said extension and communicating with the interiors of both said containers through which film may be withdrawn from a bulk film roll in said bulk film roll container and attached to a cartridge in said cartridge container, a member mounted in said extension and having film engaging means thereon in position to engage a film passing through said passageway, said movable section being so located and arranged as to form a portion of one wall of said passageway when in position, said portion being opposite said film engaging means whereby proper engagement thereof with the film may be accomplished before said movable section is placed in position, a cover comprising integral portions to cap both said containers and said passageway, indicating means carried by said cover and having driven engagement with said member to be caused thereby to indicate the amount of film withdrawn from said roll, and cartridge winding means associated with said cartridge container and engageable with a cartridge therein whereby to permit the withdrawal of film from a bulk film roll in said bulk film roll container and the winding of the film into a cartridge in said cartridge container.

2. A film cartridge loader comprising a bulk film roll container having an integral extension thereon forming part of a cartridge container, a movable section forming the remainder of the cartridge container when in position and providing a lateral opening through which a cartridge may be inserted or removed, a constantly light-trapped passageway comprising a slot formed in said extension and communicating with the interiors of both said containers through which film may be withdrawn from a bulk film roll in said bulk film roll container and attached to a cartridge in said cartridge container, a sprocket mounted in said extension in position to engage the sprocket holes of a film passing through said passageway, said movable section being so located and arranged as to form a portion of one wall of said passageway when in position, said portion being opposite said sprocket whereby proper engagement thereof with the film may be accomplished before said movable section is placed in position, a cover comprising integral portions to cap both said containers and said passageway, indicating means carried by said cover and engageable with said sprocket to be caused thereby to indicate the amount of film withdrawn from said roll, and cartridge winding means associated with said cartridge container and engageable with a cartridge therein whereby to permit the withdrawal of film from a bulk film roll in said bulk film roll container and the winding of the film into a cartridge in said cartridge container.

3. A film cartridge loader comprising a bulk film roll container having an integral extension thereon forming part of a cartridge container, a detachable section forming the remainder of the cartridge container when in position and providing a lateral opening through which a cartridge may be inserted or removed, a constantly light-trapped passageway comprising a slot formed in said extension and communicating with the interiors of both said containers through which film may be withdrawn from a bulk film roll in said bulk film roll container and attached to a cartridge in said cartridge container, a sprocket mounted in said extension in position to engage the sprocket holes of a film passing through said passageway, said detachable section being so located and arranged as to form a portion of one wall of said passageway when in position, said portion being opposite said sprocket whereby proper engagement thereof in the sprocket holes of the film may be accomplished before said detachable section is placed in position, a pin attached to said sprocket, a cover comprising integral portions to cap both said containers and said passageway, indicating means carried by said cover and comprising a toothed member engageable by said pin whereby to cause said indicating means to indicate the amount of film withdrawn from said roll, and cartridge winding means associated with said cartridge container and engageable with a cartridge therein whereby to permit the withdrawal of film from a bulk film roll in said bulk film roll container and the winding of the film into a cartridge in said cartridge container.

4. A film cartridge loader comprising a bulk film roll container having an open top and adapted to permit free axial turning of a roll of film deposited therein through the open top, an integral extension on the wall of said container having a portion at the outer end thereof adapted to hold a film cartridge therein with its axis substantially parallel with the axis of the roll of film in said container, said extension being provided with a slot connecting said container and said cartridge holding portion, said slot being of sufficient depth to accommodate a film inserted edgewise therein and being open at its top whereby the free end of a roll of film may be inserted therein as the roll is deposited in said container, a wall of said slot extending from said container only partially toward said cartridge holding portion whereby the projecting end of the film may be grasped in order to engage it with a cartridge and said cartridge holding portion having an opening adjacent the end of said slot of sufficient size to permit the insertion and removal of a cartridge attached to the film, light-trapping lining material in said slot adjacent said container, a removable section forming an extension of the outer wall of said slot adjacent said cartridge holding portion and also completing the wall of said cartridge holding portion, and a cover adapted to close the open end of said container and said slot, said cover, container and removable section having cooperating light-trapping edges so constructed as to prevent the admission of light to the bulk roll of film in said container, to the cartridge in said cartridge holding portion and to the strip of film in said slot and to permit removal of said removable section without removing said cover.

5. The structure set forth in claim 4, in combination with indicating means comprising a sprocket wheel mounted in said extension with its teeth projecting into said slot through the inner wall thereof in position to engage the sprocket holes of a film being guided through said slot.

6. The structure set forth in claim 4, in combination with indicating means comprising a sprocket wheel mounted in said extension with its teeth projecting into said slot through the inner wall thereof in position to engage the sprocket holes of a film being guided through said slot, said sprocket wheel being so mounted as to engage the film beyond said outer slot wall whereby the teeth thereof may be properly engaged with the film before positioning said removable section.

WALTER W. BOES.